April 3, 1962     F. E. SCHLAU     3,027,682
TOY VEHICLE STEERING MEANS

Original Filed Feb. 26, 1959     2 Sheets-Sheet 1

INVENTOR.
F. E. Schlau
BY
ATTORNEY

April 3, 1962     F. E. SCHLAU     3,027,682
TOY VEHICLE STEERING MEANS
Original Filed Feb. 26, 1959     2 Sheets-Sheet 2
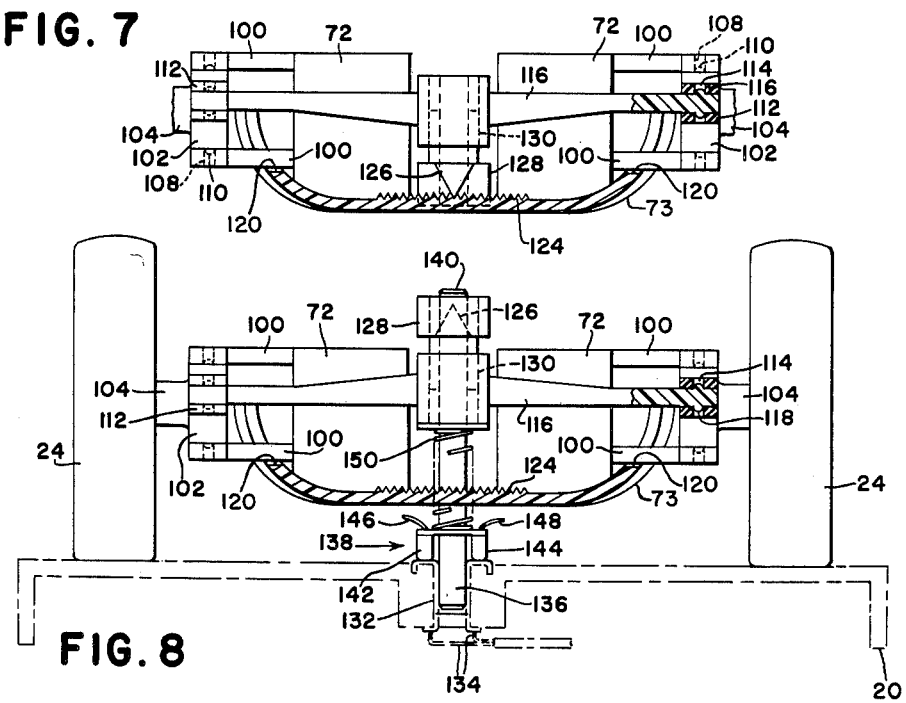
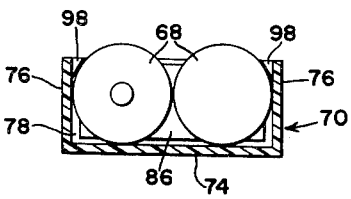
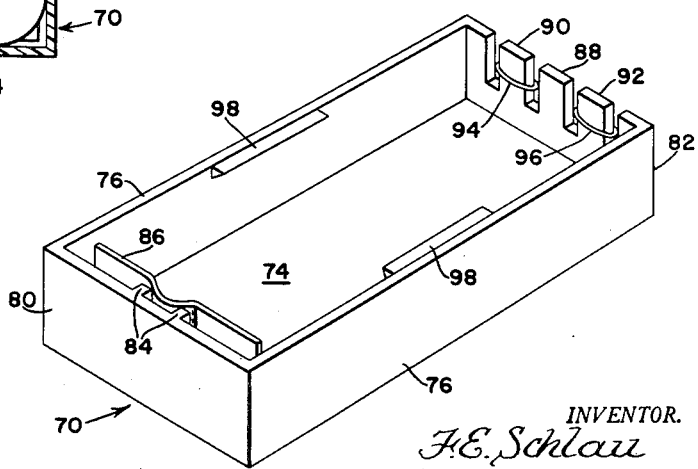
INVENTOR.
F. E. Schlau
BY
ATTORNEY

United States Patent Office 3,027,682
Patented Apr. 3, 1962

3,027,682
TOY VEHICLE STEERING MEANS
Floyd E. Schlau, Moline, Ill., assignor to Strombeck-Becker Mfg. Co., Moline, Ill., a corporation of Illinois
Original application Feb. 26, 1959, Ser. No. 795,839. Divided and this application Feb. 8, 1960, Ser. No. 7,277
11 Claims. (Cl. 46—213)

This application is a division of co-pending application Ser. No. 795,839 and the invention relates to a toy vehicle and more particularly to an electrically powered vehicle. The invention has for a principal object the provision of an improved and novel vehicle which may be optionally powered by self-contained electrical means, such as conventional dry-cell batteries, or from an electrically energized track. It is another main object to provide the toy with design features enabling its production and sale in kit form and further enabling its conversion from self-propulsion to track control and vice versa.

In the adaptation of the vehicle as powered by its own source of electrical power, it is an object of the invention to provide novel means for compactly arranging the interior components, including the batteries, a small electric motor and related elements in such manner as to facilitate assembly, disassembly, servicing and adjustment. It is a significant object to provide improved steerable wheel means which may be optionally interchanged between a status in which various steered positions may be selected and retained and a status in which the steering is freed so that when the vehicle is equipped with track follower means it may follow that track without interference from the steering selection means. It is a further feature of the invention to adapt the steering means for the removable mounting of a track follower device, particularly such device as adapted to follow a single track which is straddled by the vehicle wheels, the follower being disposed centrally between a pair of wheels. In this respect, the invention further provides for the optional attachment of electrical pickup means for use in collecting current from the energized track.

The interchangeable steering means features a part, preferably in the form of a tie rod, that may be reversed as to position so as to be bi-positionable, in one position cooperating with a retaining part to perform the selective steering function and in its other position being free from the retaining part so as to enable the vehicle to freely follow a track, for example.

The foregoing and other important objects and desirable features inherent in and encompassed by the invention will become apparent as a preferred embodiment of the invention is disclosed by way of example in the ensuing description and accompanying sheets of drawings, the several features of which are described below.

FIGURE 7 is an enlarged section on the line 7—7 of FIGURE 3, showing the steering control means set in one position.

FIGURE 8 is a similar view, showing the steering control means in its other position and further showing the front wheels, a representative track and a track follower and electrical pick-up device.

FIGURE 9 is an enlarged section on the line 9—9 of FIGURE 3.

FIGURE 10 is an enlarged perspective of the battery container.

Figure 1:
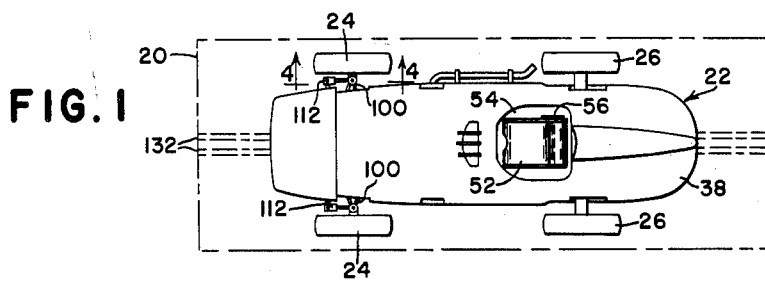
FIGURE 1 is a plan view of a typical vehicle, shown in relation to a representative track or "roadway," the latter being shown in broken lines.
Figure 2:
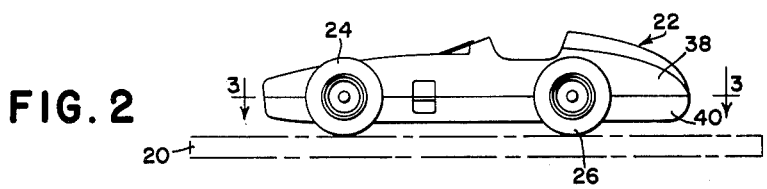
FIGURE 2 is a side elevation of the structure shown in FIGURE 1.
Figure 3:
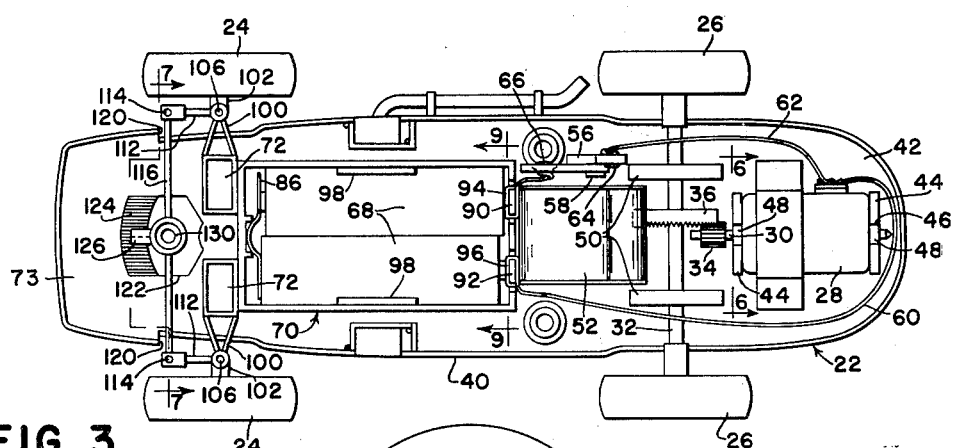
FIGURE 3 is an enlarged plan with the upper half of the body removed along a parting line coincident with the line 3—3 of FIGURE 2.
Figure 3:
Figure 4:
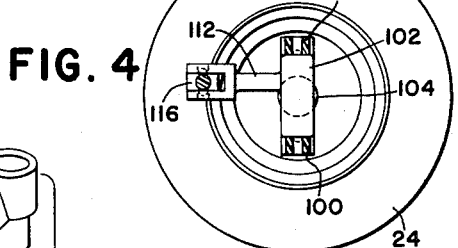
FIGURE 4 is an enlarged section on the line 4—4 of FIGURE 1.
Figure 6:
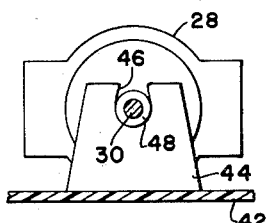
FIGURE 6 is an enlarged section on the line 6—6 of FIGURE 3.

The invention will be described first with respect to its operation as a self-propelled unit having its own source of electrical power, in which case it may be operated over any suitable surface. Its second phase, in which it is converted for travel over a track or "roadway," such as that designated generally by the numeral 20 in FIGURES 1, 2 and 8, will be described later. For present purposes, the track may be ignored.

The vehicle shown here is representative of a scale-model racing car; although, it may obviously assume any form capable of exploiting the principles and advantages of the invention. In its illustrated form, it has a fore-and-aft body 22 carried on front and rear wheels 24 and 26, respectively, and is self-propelled by an electric motor 28 of conventional nature having an output shaft 30 connected to a rear axle 32 via disconnectible drive means comprising a pinion 34 on the motor shaft and a side gear 36 on the axle. The body is preferably of two-piece construction, having upper and lower complementary shell-like halves 38 and 40, respectively, cemented together along a parting line or surface coincident with the section line 3—3 in FIGURE 2, but it may be otherwise constructed. In the present case, the bottom half 40 of the body has a rear floor part 42 from which rises fore-and-aft spaced apart supports or mounts 44, the bottom half being preferably of molded plastic or of any similar construction and material of which the mounts 44 may be integral parts. Each support or mount 44 has an upwardly facing notch 46 which receives a cooperative trunnion 48 on the motor, and these notches are upwardly convergent and the plastic material has inherent yieldability so that the trunnions, slightly oversize as respects the entrances to the notches, are received in the notches in a snap-in, snap-out fashion, whereby the motor may be readily installed or removed. Of course, the drive gears 34 and 36 are readily disengageable and engageable during this procedure. Because of the molded nature of the structure, the mounts 44 may be accurately located with the precision necessary in a toy of this type. Electric motors of the character shown are well known and the details thereof are not important, aside from the provision of the trunnions as constructed relative to the notches 46. Journals 50 for the rear axle 32 may likewise be molded as integral parts of the bottom shell 40. A cockpit or seat 52 is disposed ahead of the axle and the top shell has an opening 54 therein to accommodate this seat and to afford access to a switch lever 56 pivoted to the seat on a transverse pivot 58.

The motor has a pair of leads or wires 60 and 62, the former of which is electrically connected to a contact 64 on the lever. The lever is shown in its "off" position, with the contact 64 spaced from a fixed contact 66 on the seat, and the contact 66 is wired, in a manner to be described, to one side of the battery means, here a pair of small dry cell batteries 68 arranged in series and received or mounted removably in a battery container or box 70 disposed fore-and-aft just ahead of the seat 52. This box is removably confined between opposite sides of the body and, as to fore-and-aft position, is confined between the seat and transversely disposed front support means including a pair of laterally spaced apart front knuckle supports 72 which, like the axle journals 50, may be integral with a forward floor or transverse portion 73 of the bottom shell of the body; although, these supports may be provided as separate elements cemented in place, either at the factory or as part of the kit assembly.

The battery box 70 is shown by itself in FIGURE 10 as having a floor 74, opposite sides 76 and opposite ends 80 and 82, all molded as a one-piece structure. The interior of the end wall 80 has a pair of closely spaced apart upright lugs 84 which serve to locate a metal terminal or contact plate 86 which abuts the proximate reversed ends of the batteries 68. The other end is slit or otherwise formed as shown to afford three prongs or fingers, one of which is central at 88 and the others of which flank the finger 88 at 90 and 92. A wire from the contact 66 on the seat 52 is wrapped about the finger 90 as a loop 94, and the free end of the motor lead or wire 60 is wrapped or looped at 96 about the other flanking finger 92. These fingers and the wrapped or looped wires afford terminals in contact with the reversed ends of the batteries opposite the ends in contact with the metal plate 86 and thus enable completion of the electrical circuit to energize the motor 28 when the lever 56 is swung forward to close the circuit via the contacts 64 and 66. Wrapping of the wires about the fingers 90 and 92 enables the achievement of effective electrical connections, especially in conjunction with the pressure exerted by the ends of the batteries under the action of the plate 86, which is of spring steel and thus has inherent force in a rearward direction to urge the batteries rearwardly to improve the contacts at the wire loops 94 and 96. Each side wall 76 of the box has an upper inwardly overhanging lug 98 to hold the batteries against inadvertent upward displacement. At the same time, the dimensions of the box and the plastic material of which it is composed, permit sufficient temporary laterally outward distortion of the side walls 76 to enable deliberate removal of the batteries. The battery box itself is of compact, simple construction and its arrangement, confined between the body side walls and between the seat 52 and front supports 72, adds not only to the compactness of the assembly but enables substantial economies in manufacture. Besides, the battery box and batteries may be readily removed for installation of new batteries and may be removed entirely when the vehicle is converted for operation from the track 20, as will appear subsequently. Likewise, being a separate piece, it may be easily replaced in case of loss or breakage.

The front end structure of the vehicle is of novel and significant design. Each support 72 has an inner portion inwardly of the proximate side wall and has rigid thereon upper and lower outer portions in the form of lateral support arms 100 and each pair of arms receives therebetween a steering knuckle 102 which has an integral lateral spindle 104 on which the proximate front wheel 24 is journaled, much in the fashion of typical automotive construction. The connection between each pair of arms and its knuckle affords a pivot 106 on an upright axis, and the arms 100 are, because of the nature of the material of which composed, inherently temporarily distortable so as to be capable of being spread apart to enable removal and installation of the knuckle, the arms having vertical apertures 108 and the knuckles having upper and lower coaxial nubs or pintles 110 (FIGURES 7 and 8). These features are part of the kit aspect of the design. Obviously, the apertures and nubs could be reversed or any other type of removable connection could be used. Broadly, the knuckle-to-arm connections could as well be non-removable so long as the requisite pivots for steerability is afforded.

Each knuckle has a forwardly projecting steering arm 112 rigid thereon and each arm has a bifurcated front end apertured in vertical alinement at 114. Cross-connecting or tie rod means 116 spans the front ends of the steering arms and this tie rod has opposite ends provided with upright pintles or nubs 118 respectively received by the apertures 114 to afford vertical pivots. The structure or arrangement duplicates, largely as to general appearance and particularly as to function, conventional automotive steering in the interests of authenticity, ready separability and assembly. The bifurcated ends of the steering arms are inherently temporarily distortable to enable separation and installation of the nubbed ends of the tie rod 116, and the knuckles, steering arms and tie rod are symmetrically designed for purposes to appear later.

Figure 5:
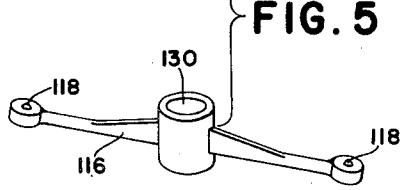
FIGURE 5 is an exploded perspective of the tie rod means.

As previously described, the front part of the lower half 40 of the vehicle body 22 has the front floor portion 73. This is turned up at opposite sides to blend into the sides of the body, each of which is apertured at 120 to accommodate the support arms 100 and the ends of the tie rod 116. In addition, the floor 73 has an opening 122 therein which exposes the central part of the tie rod from below, and a forward part of the floor along the front of the opening comprises a notched or serrated body element or part 124 which cooperates with a tie rod part or element in the form of a tooth 126. In this case, as shown in FIGURE 5, the tooth is part of a separable member 128 receivable axially in an upright bore or socket 130 in the center of the tie rod. The member 128, apart from the tooth 126, is tubular to augment the socket or bore 130, for purposes to presently appear. This member is tightly received and cemented in the bore 130 and for all practical purposes may be regarded as an integral part of the tie rod; although, its design as a separate piece has manufacturing as well as other advantages.

As already outlined, the body is preferably of molded plastic and accordingly the floor 73, particularly in the area of the serrated part 124, has a certain amount of yieldability. Hence, engagement of the tooth 126 with the serrations is not rigidly positive but is rather one of limited yieldability commensurate with the feature of selective settability and retention of a steered position of the wheels. That is to say, the tooth 126 normally engages the serrated part 124 with sufficient force to establish a resistance effective to retain a selected steered position of the front wheels, yet the resistance to steering may be overcome by manual lateral force applied for example to one of the front wheels to change the steerable wheels as to position. Hence, the vehicle, self-propelled by the motor 28, may be caused to travel straight ahead or in a circle determined by the setting of the steered position of the wheels and manual changes may be effected when desired. Besides, there is a certain amount of torsional yieldability in the tie rod because of its length in proportion to its cross section to contribute to the selectivity and retention of the steering system. These details may of course be varied in the broader aspects of the invention but the specific design has many advantages as already noted.

When the vehicle is used with the track 20, whether powered by its own batteries or energized directly from the track, it is desired that it be capable of following the track. The representative track or roadway section shown is typical of those which may be assembled end-to-end to form any of several types of circuitous paths or routes and the basic road bed may be of plastic, rubber, etc. or any other form of insulating material having desirable properties of strength, relative rigidity, etc. Such track will carry centrally thereof (in the one-lane type) a pair of metallic strips, as at 132, which may be connected electrically to line voltage, as via leads 134, which of course may utilize a suitable transformer (not shown). The strips are suitably carried by the bed and being spaced apart will afford a groove which is capable of receiving loosely therebetween a follower 136 of a track-follower device 138. This follower is of suitable non-conducting material and is affixed to a post or pivot shaft 140 which extends axially slidably and rotatably through the bore 130 in the tie rod and through the tubular member 128. Since the tie rod is ahead of the knuckle pivots 106, changes in curvature in the track will cause the tie rod to shift laterally, thus causing the wheels to be steered in conformity to the track. Likewise, when the track is straight, the wheels will follow straight ahead. In this phase of operation, it is desired that the steering system be free of the resistance involved between the tooth 126 and the serrated part 124, and the invention accommodates this by the design of the tie rod and its connections to the steering arms 112 which enables removal of the tie rod and reversal thereof for reconnection in a new position so that the tooth 126 is free from the serrated part 124. For this purpose, the tie rod 116 is symmetrical from end to end and is also symmetrical at each end; that is, all pintles or nubs 118 are alike, which is true also of the bifurcated ends of the steering arms. Hence, the tie rod may be removed, turned about its lengthwise axis through 180° and reinstalled with the tooth 126 at the top and pointed rearwardly (FIGURES 5 and 8, the latter figure being a view as seen from behind). Also, since the tie rod may be reversed end for end, it is possible to reassemble it with the tooth uppermost and pointing forwardly. Either position will free the tooth from the serrated part.

When the track is energized via the leads 134, as outlined above, the follower device 136 may also incorporate an electrical pickup means, here using a pair of separate brushes 142 and 144 having leads 146 and 148 respectively which are connectible respectively to the contact 66 and to the motor wire 60 in lieu of the battery connections at 94 and 96. Thus, the tie rod has several functions and its design is nevertheless simple and inexpensive and it can be readily interchanged from position to position. This and other features enable the kit to be furnished as either a battery-powered or a track powered unit, or it may be furnished as convertible from one form to the other. Likewise, the vehicle may be self-propelled by the battery means, and may still travel over and be guided by the track, in which case the electrical pickup means 142—144 is not required. These and other variations will readily suggest themselves. For the purpose of improving the contact of the brushes with the track strips 132, a light compression spring 150 may be employed between the underside of the tie rod and the top of the base of the follower device 138.

The foregoing covers the salient features of a commercially acceptable design in which the several objects outlined, having been found to be significant, are readily accomplished. Other objects and advantages will occur to those versed in the art, as will many modifications of the inventive embodiment disclosed, all of which are capable of exploitation without departure from the spirit and scope of the invention.

What is claimed is:

1. In a toy vehicle of the class described, the combination of: a body; a pair of transversely spaced knuckle supports on the body; a pair of steering knuckles pivotally mounted respectively on the supports; a wheel journaled on each knuckle; tie rod means spanning the knuckles and having opposite ends, each end having a detachable pivotal connection with the proximate knuckle and each connection being so constructed as respects its knuckle as to be reversible so that the tie rod means when detached is turnable about its lengthwise axis for connection to the knuckles in either of two positions; a body part adjacent to the tie rod means; and an element rigid on the tie rod means and in one position of said tie rod means engaging the body part with sufficient force to normally restrict lateral shifting of the tie rod except when deliberately manually shifted and thereby enabling selection and retention of the steered relation of the wheels to the body, and said element in the other position of the tie rod means being disengaged from the body part to enable free lateral shifting of the tie rod means.

2. The invention defined in claim 1, in which: the body part includes serrations, and the element has a tooth thereon engageable with the serrations in the first-mounted position of the tie rod means.

3. The invention defined in claim 1, in which: the body is at least in part of shell-like construction having a portion in embracing relation to the tie rod means and knuckle supports and the aforesaid body part is included in said portion.

4. In a toy vehicle of the class described, the combination of: a body; a pair of transversely spaced knuckle supports on the body; a pair of steering knuckles pivotally mounted respectively on the supports; a wheel journaled on each knuckle; tie rod means spanning the knuckles and having opposite ends pivotally connected respectively to the knuckles; a body part fixed to the body; an element connected to the tie rod and extending toward and engaging the body part with sufficient force to normally restrict lateral shifting of the tie rod except when deliberately manually shifted and thereby enabling selection and retention of the steered relation of the wheels to the body; and means mounting said element for selective disengagement from the body part and for retention in a disengaged condition to enable free lateral shifting of the tie rod means.

5. In a toy vehicle of the class described, the combination of: a body; forward means on the body including a bottom, side walls rising respectively from opposite sides of said bottom and transversely disposed support means carried by said forward means between the side walls, each side wall having an opening therethrough and said openings being transversely alined, said support means including opposite knuckle supports including inner portions inwardly of the side walls and outer portions projecting respectively laterally outwardly through the openings and each knuckle support and opening being so dimensioned as to leave an opening portion ahead of the associated knuckle support; a pair of steering knuckles, one pivotally carried by each knuckle support outer portion outwardly of the respective side wall, and each knuckle having an arm extending forwardly to a front end in transverse alinement with the aforesaid opening portion; a transverse tie rod extending across said forward means at a level above the bottom and ahead of the support means, said tie rod having opposite outer ends extending respectively through the side wall openings and respectively pivotally connected to the front ends of the knuckle arms; and detent means cooperative between the tie rod intermediate its ends and a portion of the forward means between said side walls and operative to normally restrict lateral shifting of the tie rod but yieldable to manual force to enable such lateral shifting of the tie rod for selection and retention of the tie rod and knuckles in any of several steered positions.

6. The invention defined in claim 5, in which: said detent means includes serrations on said forward means portion and a tooth on the tie rod engaging said serrations, said tie rod being of yieldable material so as to enable selective setting of said tooth along said serrations.

7. The invention defined in claim 6, in which: the tie rod is of one piece and the tooth is integral therewith; and the forward means portion includes a one-piece element in which the serrations are formed.

8. In a toy vehicle of the class described, the combination of: a body; forward means on the body including a transverse portion, side walls respectively at opposite sides of said portion and transversely disposed support means carried by said forward means between the side walls, each side wall having an opening therethrough and said openings being transversely alined, said support means including opposite knuckle supports including inner portions inwardly of the side walls and outer portions projecting respectively laterally outwardly through the openings and each knuckle support and opening being so dimensioned as to leave an opening portion extending fore and aft relative to the associated knuckle support; a pair of steering knuckles, one pivotally carried by each knuckle support outer portion outwardly of the respective side wall, and each knuckle having a fore-and-aft arm extending to a free end in transverse alinement with the aforesaid opening portion; a transverse tie rod extending across said forward means and having opposite outer ends extending respectively through the side wall openings and respectively pivotally connected to the free ends of the knuckle arms; and detent means cooperative between the tie rod intermediate its ends and a portion of the forward means between said side walls and operative to normally restrict lateral shifting of the tie rod but yieldable to manual force to enable such lateral shifting of the tie rod for selection and retention of the tie rod and knuckles in any of several steered positions.

9. In a toy vehicle of the class described, the combination of: a body; forward means on the body including a transverse portion, side walls respectively at opposite sides of said portion and transversely disposed support means carried by said forward means between said side walls and substantially enclosed by said walls and transverse portion, each side wall having an opening therethrough and said openings being transversely alined, said support means including opposite knuckle supports having outer portions respectively laterally outwardly of the walls and respectively adjacent to the openings and each knuckle support and opening being so dimensioned as to leave an opening portion extending fore and aft relative to the associated knuckle support; a pair of steering knuckles, one pivotally carried by each knuckle support outer portion outwardly of the respective side wall, and each knuckle having a fore-and-aft arm extending to a free end in transverse alinement with the aforesaid opening portion; a transverse tie rod extending across said forward means and having opposite outer ends extending respectively through the side wall openings and respectively pivotally connected to the free ends of the knuckle arms; and tooth and ratchet means cooperative between an intermediate part of the tie rod and a portion of the forward means intermediate said side walls to normally prevent lateral shifting of the tie rod but capable of being overcome by manual force for selection and retention of the tie rod in other lateral positions.

10. In a toy vehicle of the class described, the combination of: a body; forward means on the body including a bottom, side walls rising respectively from opposite sides of said bottom and transversely disposed support means carried by said forward means, each side wall having an opening therethrough and said openings being transversely alined, said support means including opposite knuckle supports having outer portions respectively laterally outwardly of the walls and respectively adjacent to the openings and each knuckle support and opening being so dimensioned as to leave an opening portion ahead of the associated knuckle support; a pair of steering knuckles, one pivotally carried by each knuckle support outwardly of the respective side wall, and each knuckle having an arm extending forwardly to a front end in transverse alinement with the aforesaid opening portion; a transverse tie rod extending across said forward means at a level above the bottom and ahead of the support means, said tie rod having opposite outer ends extending respectively through the side wall openings and respectively pivotally connected to the front ends of the knuckle arms; and forcibly releasable means cooperative between an intermediate part of the tie rod and a portion of the forward means intermediate said side walls to normally restrict lateral shifting of the tie rod from selected lateral positions.

11. The invention defined in claim 8, in which the detent means includes an element on the forward means between the side walls and an element on the tie rod intermediate its ends, one of said elements including a tooth projecting normal to the length of the tie rod and the other of said elements including serrations with which the tooth is engageable, and said tie rod is flexible in a direction normal to its length to normally bias the tooth into engagement with the serrations but capable of yielding to enable the tooth to ratchet over the serrations when endwise force is applied to the tie rod.

References Cited in the file of this patent

UNITED STATES PATENTS

| 2,068,403 | Elkstrom | Jan. 19, 1937 |
| 2,603,913 | Ernst | July 22, 1952 |
| 2,803,090 | Johnson | Aug. 20, 1957 |
| 2,818,463 | Parker | Dec. 31, 1957 |
| 2,862,332 | Johnson | Dec. 2, 1958 |
| 2,886,623 | Lehr | May 12, 1959 |
| 2,888,778 | Carter | June 2, 1959 |

FOREIGN PATENTS

| 917,420 | Germany | Sept. 2, 1954 |